Feb. 19, 1946. O. J. POUPITCH 2,395,141
FASTENER DEVICE
Filed Nov. 15, 1943 2 Sheets-Sheet 2
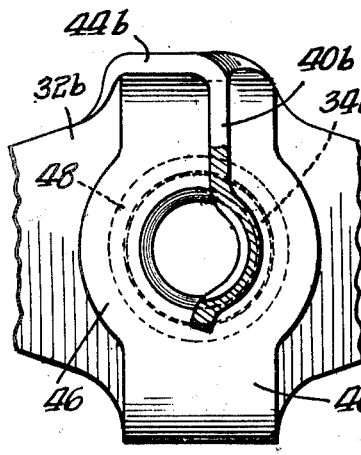
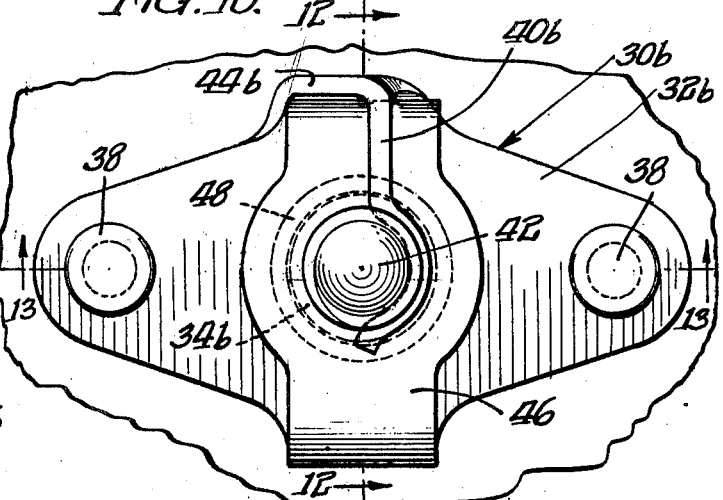
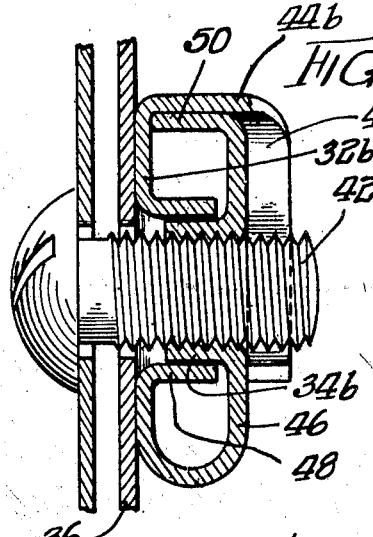
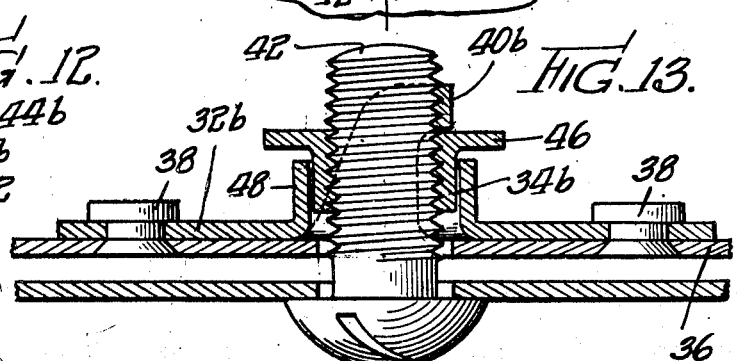
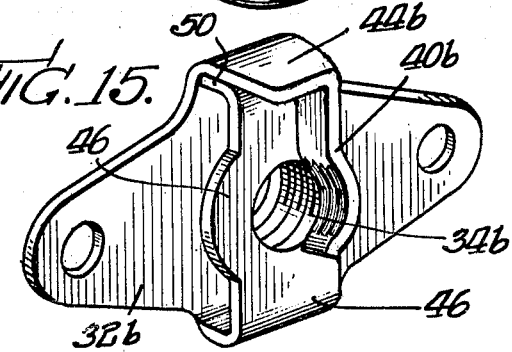
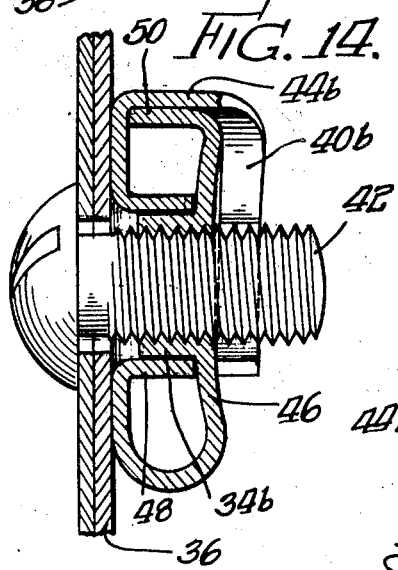
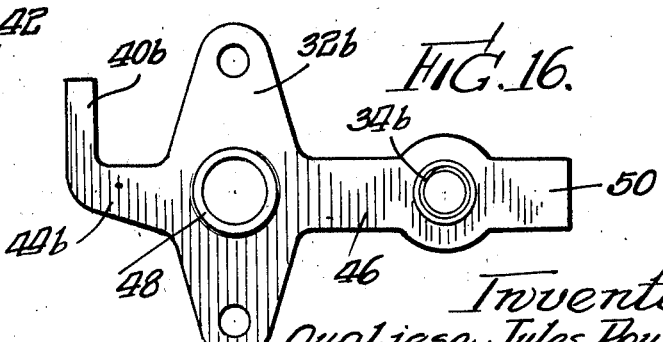
Inventor
Ougljesa Jules Poupitch
By: Loftus, Moore, Olson & Trexler attys.

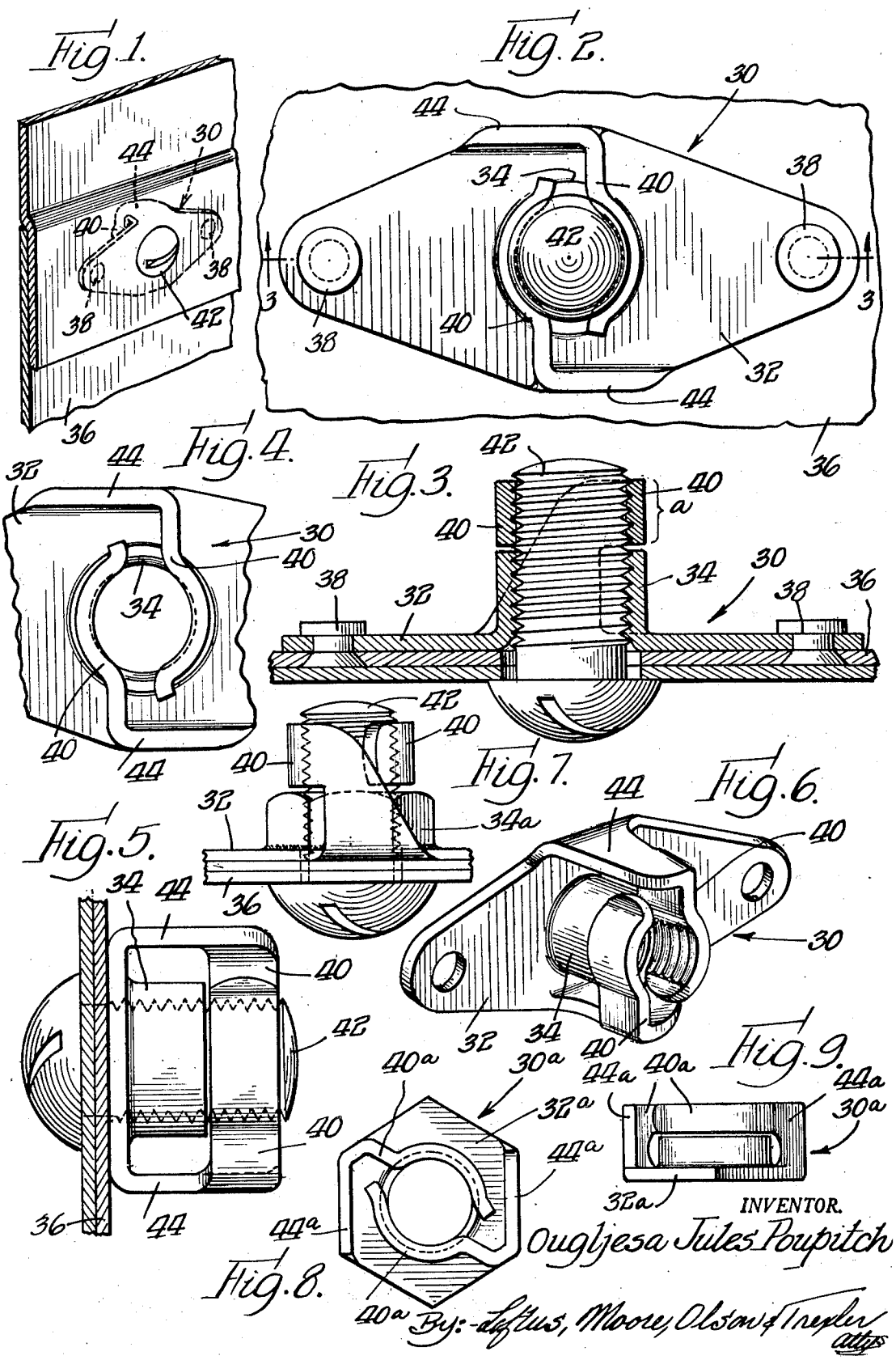

Patented Feb. 19, 1946

2,395,141

UNITED STATES PATENT OFFICE 2,395,141

FASTENER DEVICE

Ougljesa Jules Poupitch, Chicago, Ill., assignor to Illinois Tool Works, Chicago, Ill., a corporation of Illinois Application November 15, 1943, Serial No. 510,287

12 Claims. (Cl. 151—14)

This invention relates generally to fastener devices and more particularly to fastener devices employing sheet metal stock.

The invention disclosed herein is similar in certain functional respects to the device shown in my co-pending application, Serial No. 477,186, filed February 26, 1943. The structure contemplated hereby is similar to that disclosed in the aforesaid co-pending application in that frictional locking of a screw element is accomplished by the use of a resilient arm extending from a sheet metal base section which has a free thread engaging extremity capable of being flexed outwardly when engaged by a complementary screw member. The present invention, however, contemplates certain important structural differences with respect to the disposition of the aforesaid resilient thread engaging arm, as well as certain structural differences relating to a threaded or screw receiving portion which is non-rotatable with respect to the base.

It is an important object of the present invention to provide a fastener device, of the type referred to above, wherein substantial thread engagement between a resilient arm and a complementary screw member is obtained so as to materially enhance frictional resistance against loosening.

More specifically, the invention contemplates a fastener device wherein an arm or pair of oppositely disposed arms extend tangentially with respect to a complementary screw member and present a locking surface of substantial width which may be flexed radially outward as an incident to the engagement therewith of the periphery of a complementary screw member.

It is a further object of the invention to provide a fastener as set forth above wherein a nut element may be employed as the screw receiving portion in association with the resilient thread engaging arm.

The foregoing, and other objects and advantages, will be more apparent when the following detailed description is considered in connection with the accompanying drawings, wherein:

Fig. 1 is a perspective view showing the manner in which two metallic sheets may be secured together by a fastener of the type contemplated by the present invention;

Fig. 2 is an enlarged elevational view of the rear side of the plates shown in Fig. 1 to more clearly illustrate the structural characteristics of the fastener contemplated by the present invention;

Fig. 3 is a central sectional view of the fastener and associated sheet metal workpiece taken substantially along the line 3—3 of the Figure 2;

Fig. 4 is a fragmentary elevational view of the device shown in Fig. 2 when the complementary screw member is detached therefrom, to more clearly illustrate the eccentric positions occupied by the free extremity of the locking arms prior to the association therewith of said complementary screw;

Fig. 5 is an elevational view of the fastener as viewed from the left of Fig. 2;

Fig. 6 is a perspective view of the fastener detached from the workpiece and the screw member;

Fig. 7 is a fragmentary elevational view of a modified structure similar to that shown in Fig. 3 to illustrate the manner in which the central extruded portion may be supplanted by a nut element secured to the base in instances where desired, this arrangement having a particular adaption in instances where the material of the base does not readily lend itself to extrusion;

Fig. 8 is an elevational view of the structure shown in the previous views modified to conform in shape to a nut;

Fig. 9 is a front elevational view of the device shown in Fig. 8;

Fig. 10 is an enlarged elevational view similar to Fig. 2 disclosing a modification wherein the screw receiving section is formed integral with the section which superimposes the base;

Fig. 11 is a fragmentary view of the central portion of the fastener as shown in Fig. 10 with the screw element removed and the resilient locking arm shown in section to more clearly illustrate the eccentric position occupied by the free extremity of the arm prior to the association therewith of a screw member;

Fig. 12 is a transverse sectional view taken substantially along the line 12—12 of Fig. 10 prior to the final tightening of the screw member;

Fig. 13 is a central sectional view taken substantially along the line 13—13 of Fig. 10;

Fig. 14 is a view similar to Fig. 12 showing the position occupied by the parts after the screw element has been tightened into position;

Fig. 15 is a perspective view of the fastener shown in Figures 10 to 14, inclusive; and Fig. 16 is a plan view of the blank from which the fastener shown in Figures 10 to 15 may be formed.

Referring now to the drawings more in detail wherein like numerals have been employed to designate similar parts throughout the various figures, it will be seen that one embodiment of the present invention contemplates a sheet metal fastener device designated generally by the numeral 30. This device 30 includes a base section 32 and a central internally threaded section 34 extending laterally of the base section or plate 32. In the disclosed embodiment this internally threaded laterally extending section 34 is formed integral with the base section 32. The base section 32 is adapted to be secured to a workpiece or plate 36 by means of suitable fastener elements or rivets 38 which extend through complementary apertures in the base section and workpiece.

The material of the base section 32 is provided with extensions on opposite sides thereof in the form of resilient locking members or arms 40. In order to obtain substantial thread engagement with the periphery of a complementary screw member 42, the width of the arms 40 as designated by the bracket A, Figure 3, is substantial as compared with the thickness of the stock. The thread engaging portion of these arms is bent arcuately so as to conform with a substantial portion of the periphery of the screw member 42, the fixed extremity of each arm being hingedly coupled with a support member 44 along a line which is substantially normal to the plane of the base 32. These supports 44 are peripherally formed integral with and extend laterally of the base section 32.

It will be apparent that the arms 40 extend in a substantially tangential direction with respect to the complementary screw member 42 and prior to the association of the screw member with said arms, the free extremities thereof occupy the position shown in Figure 4. That is to say, the thread engaging portions or free extremities of the arms are normally positioned eccentrically with respect to the axis of the screw receiving section 34. Thus, when the screw 42 is rotated into association with the internally threaded portions of the arms, said arms are resiliently urged radially outward into concentric relation with respect to the screw axis as shown in Figure 2. The outward flexing of the arms 40 about an axis which traverses the plane of the base section 32 establishes firm locking frictional resistance against loosening of the screw member.

Particular attention is directed to the fact that the arms 40 extend tangentially with respect to the screw member (see Figure 2) in such a direction as to present less frictional resistance to rotation when the screw is applied in a counterclockwise direction as viewed in Figure 2, than the frictional resistance experienced by the screw when the screw is rotated in a loosening clockwise direction as viewed in Figure 2. Stating it another way, the arcuate portions of each arm 40, when viewed from the top thereof as illustrated in Figure 2, extend toward the free extremity in a clockwise direction. Thus, when the screw is initially applied to the fastener, the free extremity thereof has a tendency to spring outwardly to permit the passage of the screw member. On the other hand after the screw member has been inserted and rotation is applied to the screw in a clockwise direction as viewed in Figure 2, the force applied to the internal surface of the arm is such as to cause the arm to experience the tendency to wrap itself around the screw surface instead of permitting itself to be pushed away from the screw surface.

It will also be noted that by having each arm extend at substantially a right angle plane of its support 44 as viewed in Figure 2, instead of extending in a direction tangentially in relation to the screw, an increased arcuate thread engaging area is obtained. This increase in arcuate engaging area enhances the tendency for the arm to frictionally wrap itself into association with the periphery of the screw when the screw is subjected to forces tending to loosen it.

It will also be noted that the terminal of each of the arms 40 is bent away from the arcuate thread engaging section. This facilitates easy entrance or association of the screw by eliminating sharp corners or rough edges which may have a tendency to mill or otherwise mar the surface of the screw member. It is important from the standpoint of efficient functioning of the device to avoid as far as possible any physical impairment of the screw thread surface. By so doing, the fastener may be used repeatedly without causing any wear or disfigurement of the screw thread.

A slight modification of the structure heretofore described is illustrated in Figures 8 and 9. The fastener device disclosed therein is designated by the numeral 30a. The only structural difference in the fastener 30a and the fastener 30 is that the base portion designated by the numeral 32a is shaped to conform with the peripheral contour of a nut. The laterally extending supports 44a function similarly to the supports 44 in resiliently or hingedly supporting thread engaging arms 40a. In the fastener 30a the supports 44a also function as side surfaces of a nut capable of being clamped by a wrench. In all other respects the device 30a is functionally similar to the device 30 previously described.

In instances where the fastening device must be produced in very small sizes from relatively light gauge stock, it is more practical to extrude a central screw receiving section such as the section 34 illustrated in Figure 3. This difficulty may be overcome by employing a separate nut element 34a as illustrated in Figure 7. The nut element 34a may be secured by welding, or in any other suitable manner, to the base section 32. This arrangement is also of practical significance in instances where the sheet metal fastener stock does not readily lend itself to extrusion.

In Figures 10 to 16, inclusive, a modified fastener device is shown. This fastener device is designated generally by the numeral 30b. It is provided with a sheet metal base section 32b and a resilient thread engaging arm 40b which superimposes the base section 32b and forms an integral extension of a support 44b. A support section or plate 46 superimposes the base section 32b and is maintained in spaced relation with respect to the base section by a connecting section 48 at one side and a flange 50 on the opposite side of Figure 12. The superimposing section 46 serves as a support for an internally threaded screw receiving section 34b.

The screw receiving section 34b functions similarly to the previously described screw receiving section 34 and nut 34a, and has the added capacity to yield toward the plane of the base section when the screw member 42 is tightened to the position shown in Figure 14. In this position the superimposing plate section 46 is flexed toward the plane of the base and as tightened sufficiently by the action of the screw 42, the underside of the plate 46 is brought into abutting relation with an extruded section 48 extending laterally of the base section. The stressing of the plate 46 tends to increase impingement of the thread convolutions in the screw receiving section 34b with the thread convolutions of the screw member 42. Thus, the frictional resistance established by the flexing of the plate section 46 coupled with the frictional resistance between the arm 40b and the screw member serves to effectively secure the screw member against inadvertent or unauthorized loosening.

In Figure 16 a blank is shown which may be folded and bent to form the fastener 30b. The inner arcuate portion of the arm 44b like the inner arcuate area of the arms 44 and 44a, previously described, may be provided with thread engaging surface portions conforming with the thread contour in the complementary screw member 42.

From the foregoing, it will be apparent that the present invention contemplates a fastener of extremely simple construction wherein locking frictional engagement with the periphery of a screw member is obtained the instant that the free extremity of the yieldable arm is engaged by the screw thread. That is to say, the screw locking means includes a resilient thread engaging arm providing a substantial thread engaging area of arcuate form normally eccentric to the axis of the internal helix of the screw receiving section or nut whereby when the screw member and thread helix are relatively rotatable, the thread and the screw member will engage the arcuate section of the arm and cause it to move radially outward into a position of concentricity with respect to the screw axis. Stating it another way, the substantial thread engaging portion of the arm is shiftable radially outward as an incident to relative rotation between the internal helix of the thread receiving section and a complementary screw member whereby to increase frictional locking resistance between the resilient arm and screw thread. This outward radially shifting of the free extremity of the arm takes place about an axis extending transversely of the base by reason of the hinge coupling between the arm and the support extending laterally of and integral with the base section.

Obviously, changes in the specific structural details may be made without departing from the spirit and scope of the invention as set forth in the appended claims.

The invention is hereby claimed as follows:

1. A fastener device including a sheet metal base section, a screw receiving section non-rotatable with respect to said base section and having an internal screw accommodating helix, and locking means for frictionally engaging the thread of a screw member complementary to and projecting axially beyond the helix of said screw receiving section, said locking means including a resilient arm supported by and bent over the base section, said arm having a screw thread engaging section formed at its free extremity providing an arcuate thread engaging surface of substantial length and axial width compared to stock thickness for resisting rotation in either direction without biting into the screw thread and shiftable radially outward as an incident to the engagement therewith of a complementary screw member during relative rotation between said internal helix and said screw member whereby to increase frictional locking resistance in either direction between said resilient arm and screw thread.

2. A fastener device including a sheet metal base section, a screw receiving section non-rotatable with respect to said base section and having an internal screw accommodating helix, and locking means for frictionally engaging the thread of a screw member complementary to and projecting axially beyond the helix of said screw receiving section, said locking means including a resilient arm supported by and bent over the base section, said arm having a screw thread engaging section formed at its free extremity providing an arcuate thread engaging surface for resisting rotation in either direction without biting into the screw thread, said surface being of substantial length and axial width compared to stock thickness, arcuately disposed and shiftable radially outward as an incident to the engagement therewith of a complementary screw member during relative rotation between said internal helix and said screw member whereby to increase frictional locking resistance in either direction between said resilient arm and screw thread.

3. A fastener device including a sheet metal base section, a screw receiving section non-rotatable with respect to said base section and having an internal screw accommodating helix, and locking means for frictionally engaging the thread of a screw member complementary to and projecting axially beyond the helix of said screw receiving section, said locking means including a pair of oppositely disposed resilient arms supported by and bent over the base section, each of said arms having a screw thread engaging section formed at its free extremity providing an arcuate thread engaging surface of substantial length and axial width compared with stock thickness for resisting rotation in either direction without biting into the screw thread and shiftable radially outward as an incident to the engagement therewith of a complementary screw member during relative rotation between said internal helix and said screw member whereby to increase frictional locking in either direction between said resilient arms and screw thread.

4. A fastener device including a sheet metal base section, a screw receiving section non-rotatable with respect to said base section and having an internal screw accommodating helix, and locking means for frictionally engaging the thread of a screw member complementary to and projecting axially beyond the helix of said screw receiving section, said locking means including a resilient thread engaging arm supported by the base section, said arm adapted to extend tangentially with respect to the complementary screw member engaged thereby and having its thread engaging portion arcuately disposed and normally positioned radially of the axis of said screw member a distance which is less than the maximum radius of said screw whereby the engagement of the thread of the screw member with said arm will cause said arm to shift radially outward and thus increase frictional locking resistance between the arm and screw thread, said arcuate thread engaging portion of the arm when viewed in plan curving from a point of engagement to a free extremity in a clockwise direction whereby to enhance frictional resistance to the loosening of a complementary screw.

5. A fastener device as set forth in claim 4 wherein the arcuate thread engaging portion is of substantial width compared to stock thickness and conforming in curvature with a substantial portion of the periphery of a complementary screw member.

6. A fastener device including a sheet metal base section, a screw receiving section non-rotatable with respect to said base section and having an internal screw accommodating helix, and locking means for frictionally engaging the thread of a screw member complementary to and projecting axially beyond the helix of said screw receiving section, said locking means including a pair of resilient thread engaging arms supported by the base section, each of said arms adapted to extend tangentially with respect to the complementary screw member engaged thereby and having its thread engaging portion arcuately disposed and normally positioned radially of the axis of said screw member a distance which is less than the maximum radius of said screw whereby the engagement of the thread of the screw member with said arm will cause said arm to shift radially outward and thus increase frictional locking resistance between the arm and screw thread, said arcuate thread engaging portion of each arm when viewed in plan curving from a point of engagement to a free extremity in a clockwise direction whereby to enhance frictional resistance to the loosening of a complementary screw.

7. A fastener device including a sheet metal base section, a screw receiving section non-rotatable with respect to said base section and having an internal screw accommodating helix, and locking means for frictionally engaging the thread of a screw member complementary to and projecting axially beyond the helix of said screw receiving section, said locking means including a support extending laterally of said base section and an arm forming a continuation of said support and bent to provide a hinge coupling along a line extending normal to said base, said arm superimposing the base section and having an arcuate thread engaging section of substantial arcuate length and axial width at its free extremity for resisting rotation in either direction without biting into the screw thread and shiftable radially outward about an axis extending normal to said base as an incident to the thread engagement therewith of a complementary screw member during relative rotation between said internal helix and said screw member whereby to increase frictional locking resistance in either direction between said resilient arm and screw thread.

8. A fastener device including a sheet metal base section having means for securing said section to a member to be fastened, a screw receiving section non-rotatable with respect to said base section and having an internal screw accommodating helix, and locking means for frictionally engaging the thread of a screw member complementary to and projecting axially beyond the helix of said screw receiving section, said locking means including an arm supported by and superimposing the base section, said arm having a free extremity provided with an arcuate thread engaging surface portion of substantial arcuate length and axial width compared to stock thickness for resisting rotation in either direction without biting into the screw thread and shiftable radially outward as an incident to the engagement therewith of a complementary screw member during relative rotation between said internal helix and said screw member whereby to increase frictional locking resistance in either direction between said resilient arm and screw thread.

9. A fastener device including a sheet metal base section, a screw receiving section non-rotatable with respect to said base section and having an internal screw accommodating helix, and locking means for frictionally engaging the thread of a screw member complementary to and projecting axially beyond the helix of said screw receiving section, said locking means including an arm supported by the base section, said arm comprising an extension of the side margin of said base and bent into superimposing relation with respect to said base along a line extending substantially normal to the plane of said base, the thread engaging portion at the free extremity of said arm having an arcuate surface portion of substantial arcuate length and axial width for resisting rotation in either direction without biting into the screw thread, said surface being shiftable radially outward as an incident to relative rotation between said internal helix and complementary screw member whereby to increase frictional locking resistance in either direction between said resilient arm and screw thread.

10. A fastener device including a sheet metal base section, an internally threaded nut member secured in non-rotatable relation with respect to said base section, and locking means for frictionally engaging the thread of a screw member complementary to and projecting axially beyond said nut, said locking means including an arm supported by and superimposing the base section, said arm having a free extremity provided with an arcuate thread engaging surface portion of substantial arcuate length and axial width compared to stock thickness for resisting rotation in either direction without biting into the screw thread and shiftable radially outward about an axis extending transversely of said base as an incident to the engagement therewith of a complementary screw member during relative rotation between said nut and said screw member whereby to increase frictional locking resistance in either direction between said resilient arm and screw thread.

11. A fastener device including a sheet metal base section, a screw receiving section non-rotatable with respect to said base section and having an internal screw accommodating helix, and locking means for frictionally engaging the thread of a screw member complementary to and projecting axially beyond the helix of said screw receiving section, said locking means including a resilient arm supported by and bent over the base section, said arm having an arcuate screw thread engaging section formed at its free extremity providing a thread engaging surface of substantial arcuate length and axial width compared to stock thickness for resisting rotation in either direction without biting into the screw thread and shiftable radially outward as an incident to the engagement therewith of a complementary screw member during relative rotation between said internal helix and said screw member whereby to increase frictional locking resistance in either direction between said resilient arm and screw thread, the inner portion of said screw thread engaging section adjacently superimposing said screw receiving section.

12. A fastener device including a sheet metal base section, a screw receiving section non-rotatable with respect to said base section and having an internal screw accommodating helix, and locking means for frictionally engaging the thread of a screw member complementary to and projecting axially beyond the helix of said screw receiving section, said locking means including a pair of oppositely disposed resilient arms supported by and bent over the base section, each of said arms having a screw thread engaging section formed at its free extremity providing an arcuate thread engaging surface of substantial arcuate length and axial width compared with stock thickness for resisting rotation in either direction without biting into the screw thread and shiftable radially outward as an incident to the engagement therewith of a complementary screw member during relative rotation between said internal helix and said screw member whereby to increase frictional locking resistance in either direction between said resilient arms and screw thread, the inner portion of each screw thread engaging section adjacently superimposing said screw receiving section.

OUGLJESA JULES POUPITCH.